US006725106B1

(12) United States Patent
Covington et al.

(10) Patent No.: US 6,725,106 B1
(45) Date of Patent: Apr. 20, 2004

(54) SYSTEM AND METHOD FOR BACKING UP DISTRIBUTED CONTROLLERS IN A DATA NETWORK

(75) Inventors: Steve Covington, New Braunfels, TX (US); David Ashby, New Braunfels, TX (US)

(73) Assignee: AutoGas Systems, Inc., Abilene, TX (US)

( * ) Notice: Subject to any disclaimer, the term of this patent is extended or adjusted under 35 U.S.C. 154(b) by 380 days.

(21) Appl. No.: 09/796,664

(22) Filed: Feb. 28, 2001

Related U.S. Application Data

(60) Provisional application No. 60/185,327, filed on Feb. 28, 2000.

(51) Int. Cl.[7] .................................................. G05B 9/02

(52) U.S. Cl. ............................... 700/82; 700/3; 700/19; 700/20; 700/21; 700/79; 700/9; 700/241; 709/220; 714/13; 222/52

(58) Field of Search ............................ 700/79, 82, 241, 700/9, 20, 21, 3, 19; 709/220; 714/13; 222/52

(56) References Cited

U.S. PATENT DOCUMENTS 4,035,770 A * 7/1977 Sarle .......................... 710/100
4,351,023 A * 9/1982 Richer ......................... 700/82
5,202,822 A * 4/1993 McLaughlin et al. ......... 700/82
5,583,796 A * 12/1996 Reese ......................... 702/185
5,796,936 A * 8/1998 Watabe et al. ............... 358/1.9
5,845,095 A * 12/1998 Reed et al. ................. 710/104
5,886,732 A * 3/1999 Humpleman ................. 725/49
5,895,457 A * 4/1999 Kurowski et al. .......... 705/413
5,980,090 A * 11/1999 Royal, Jr. et al. ........... 700/241
6,085,333 A * 7/2000 DeKoning et al. ............. 714/7
6,230,200 B1 * 5/2001 Forecast et al. ............ 709/226
6,557,031 B1 * 4/2003 Mimura et al. ............. 709/213

* cited by examiner

*Primary Examiner*—Ramesh Patel
*Assistant Examiner*—Douglas Shute
(74) *Attorney, Agent, or Firm*—Steven W. Smith

(57) ABSTRACT

A system and method for the rapid configuration and connection of a backup controller in a distributed data network such as an automated fuel distribution network. Each service-station site in the network has a site controller that supervises operations of the site components, such as the fuel dispenser and credit-card reader, communicating with them through an on-site router, or hub. The fuel-distribution site also communicates with the central network controller through the same hub. In the event of a site-controller outage, one of several spare controllers, usually co-located with the network controller, is loaded and configured to function as the site controller. It is then placed in communication with the site components via a data-network connection, such as through the Internet. The hub switches communications protocols from serial data to packets suitable for Internet communications.

20 Claims, 4 Drawing Sheets

SYSTEM AND METHOD FOR BACKING UP DISTRIBUTED CONTROLLERS IN A DATA NETWORK

This application claims the priority of the U.S. Patent Application: U.S. Patent Application Serial No. 60/185,327 filed Feb. 28. 2000.

BACKGROUND OF THE INVENTION

1. Technical Field of the Invention

This invention relates to distributed data networks and, more particularly, to a system and method in a distributed data network of rapidly and efficiently backing up distributed controllers in the network.

2. Description of Related Art

Data networks today may be distributed over wide areas, with a plurality of site locations being linked together over the network. Each of the distributed sites may be controlled by a site controller or central processing unit (CPU) such as a personal computer (PC). For various reasons (for example, power supply failure, hard disk crash, motherboard failure, etc.), a site controller may occasionally fail. Currently, whenever a site controller fails, a network operator must locate an available service technician (and parts) to travel to the site to repair or replace the failed controller. During this time, the site is out of business. That is, the operator of the site is unable to service his customers. Site downtime could be measured in hours or even days.

In order to overcome the disadvantage of existing solutions, it would be advantageous to have a system and method for rapidly and efficiently backing up distributed controllers in the network. The invention would enable the site to continue operations while a technician is dispatched to the site for troubleshooting and repair of the failed site controller. The present invention provides such a system and method.

SUMMARY OF THE INVENTION

In one aspect, the present invention is a system in a distributed data network, for example a network of automated fuel station controllers, for rapidly and efficiently backing up distributed controllers in the network. At each distributed site, the system includes a router, a site controller connected to the router, and a plurality of site devices connected to the site controller through the router. The router, in turn, is connected through a data network to a central controller. The central controller is connected to a database of configuration data for each distributed site, and to a plurality of backup controllers.

In another aspect, the present invention is a method in a distributed data network of rapidly and efficiently backing up distributed controllers in the network. The method begins when a failure of a site controller is detected. A notice of the failure is then sent to a central controller which includes a rack of spare controllers and a database of site configurations. A spare controller is selected and configured with the configuration of the troubled site. The site router at the troubled site is then reconfigured to connect the spare controller to the troubled site through the data network. The spare controller then takes over as the site controller while the faulty controller is repaired or replaced.

In yet another aspect, the present invention is a router that connects a site controller to a data network, and connects a plurality of site devices having serial interfaces to the site controller. The router may include means for detecting a failure of the site controller, or the router may receive an indication from a central controller on the network that the site controller has failed. In the event of a failure of the site controller, the router converts the serial interface data from the plurality of site devices to Internet Protocol (IP) packets and routes the packets over the data network to the central controller.

In yet another aspect, the present invention is a method of backing up an automated fueling-station controller in communication with a data network, including the step of providing at least one spare controller that is also in communication with the data network. When station-controller failure is detected, the method continues with the steps of configuring the spare controller using controller-configuration information previously stored in a database, and routing station-controller communications through the data network to the configured spare controller until the station controller is restored to service.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method in a distributed data network of rapidly and efficiently backing up distributed controllers in the network. The invention utilizes Internet technology to reduce the site downtime by facilitating the rapid configuration and connection of a backup controller. The turnaround time is reduced to several minutes as opposed to several hours or days.

All of the distributed sites in a distributed data network are connected to a central controller via, for example, the Internet or a private IP-based intranet. The solution includes a router (or hub) at each site that preferably includes an interworking function (IWF) for interfacing non-IP site devices with the IP-based data network. The site devices are connected to the router which in turn connects to the site controller. The router, in turn, is connected through the IP data network to the central controller. The central controller is connected to a database of configuration data for each distributed site, and to a plurality of backup controllers that may be located, for example, at a help desk.

The router may include means for detecting a failure of the site controller, or the failure may be detected by the central controller. For example, the site controller may send a periodic "heartbeat" signal to the central controller indicating that it is operating normally. If the heartbeat signal stops, the central controller sends an indication to the router that the site controller has failed. Alternatively, an operator at the site may call a central help desk and report the site controller failure.

Upon detection of a failure of one of the site controllers, a notice is sent to a remote help desk which includes a rack of spare site controllers and a database of site configurations. A spare site controller is selected and configured with the configuration of the troubled site. The site router at the troubled site is then reconfigured to connect the spare site controller at the remote help desk to the troubled site. The spare site controller then takes over as the site controller while the faulty controller is repaired or replaced.

In the preferred embodiment of the present invention, the invention is described in the context of the fueling industry in which a distributed network controls a plurality of automated service stations. These automated 'self-service' stations allow customers to dispense their own fuel, but may in fact be fully or only partially automated. Each station has a PC which functions as a site controller. Other site devices, with serial interfaces to the PC, include such devices as gasoline dispensers, island card readers, and payment system dial modem interfaces. A failure in the PC causes the router to convert the serial interface data from the site devices to IP packets, and route the packets over the data network to a backup PC which has been configured by the central controller to replace the site PC while it is being repaired.

Figure 1:
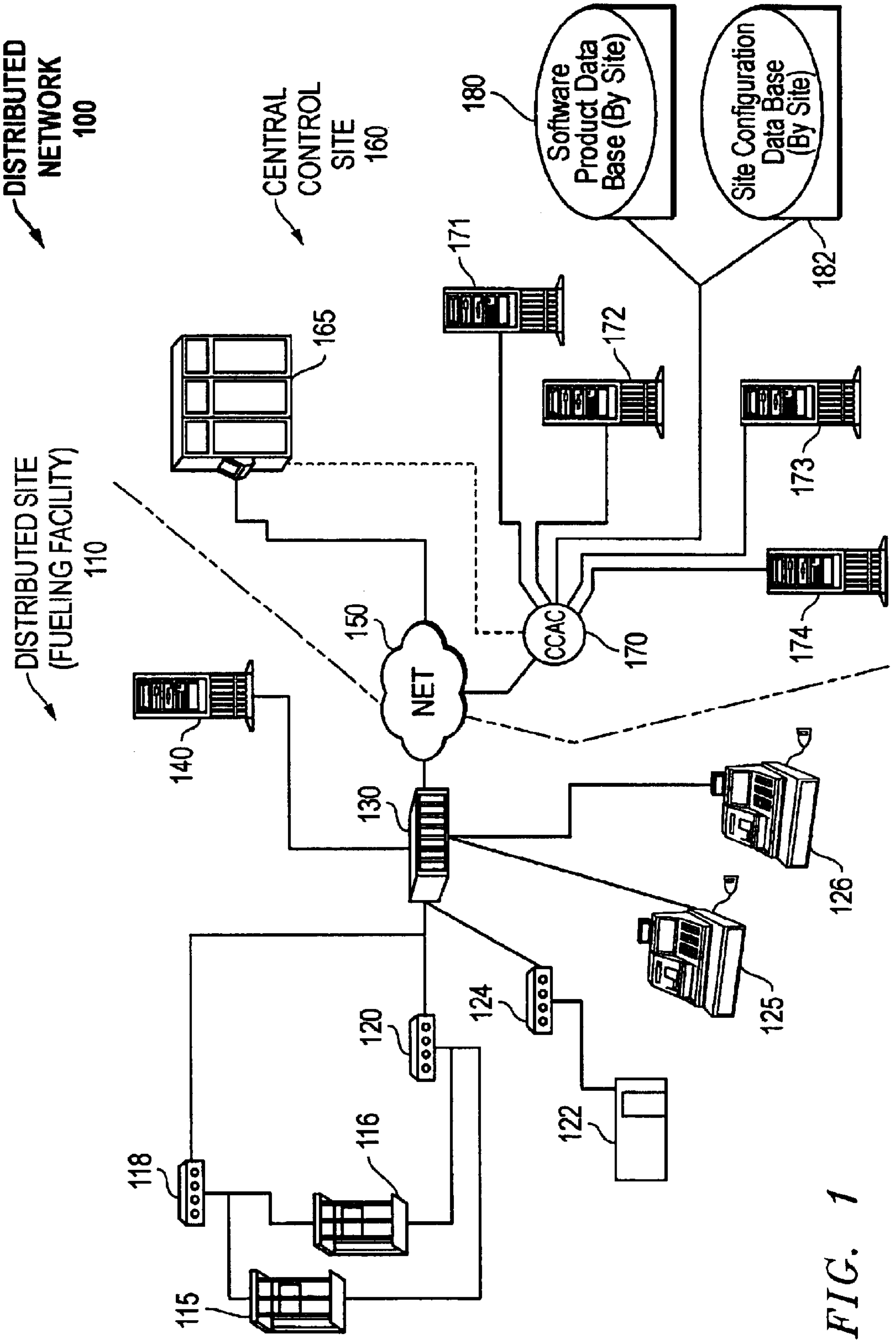
FIG. 1 is a simplified block diagram of an embodiment of the system of the present invention.

FIG. 1 is a simplified block diagram of an embodiment of the system of the present invention. In this embodiment, distributed network 100 includes distributed site 110, here an automated fueling facility, and central control site 160. While for illustration they are separated by a broken line, there is no physical or distance separation requirement. (In one alternative embodiment, for example, the central control site and one of several distributed sites in the distributed network may exist at the same location, or even use the same computer.) For clarity, only a central control site and one automated fueling facility are illustrated in FIG. 1, though there could be (and usually are) numerous distributed sites, and possibly two or more control sites. Communications are accomplished over a data-communications network 150, which is often the Internet or a wide-area network (WAN), but could be any other suitable network such as an intranet, extranet, or virtual private network (VPN).

Fueling facility 110 includes fuel dispensers 115 and 116, from which consumers can dispense their own fuel. Such fuel dispensers typically have an island card-reader (ICR) (not shown) that allows purchasers to make payment for the fuel they receive by, for example, credit or debit card. An ICR interface 118 handles communications to and from the ICRs located on dispensers 115 and 116 so that credit or debit purchases can be authorized and the appropriate account information gathered. The dispensers 115 and 116 themselves communicate through dispenser interface 120, for example, to receive authorization to dispense fuel or to report the quantity sold.

On-site primary controller 140 is a PC or other computing facility that includes operational software and data storage capabilities in order to be able to manage site operations. Site operations may include not only fuel dispensing but related peripheral services as well, such as a robotic car wash. For illustration, car-wash controller 122 is shown communicating through peripheral interface 124. Communication with separate automated devices, such as a car wash, may be desirable, for example to allow payment to be made through an ICR at the dispenser, or to adjust the price charged based on other purchases already made. Point-of-sale (POS) terminals 125 and 126 are stations for use by a human attendant in totaling and recording sales, making change, and preforming credit card authorizations, and may be used for inventory control as well.

Each of the site components (and any others that may be present), communicate directly or indirectly with on-site primary controller 140 and each other though hub 130. Hub 130 is an on-site router that directs data traffic, typically serial communications between the various on-site components. Generally, the hub 130 will receive a communication, determine where it should be sent, and effect transmission when the addressed device is ready to receive it. In addition, hub 130 is connected to data network 150 so that the distributed site 110 can communicate with the central control site 160. Note that this connection can be permanent or ad hoc, as desired.

In this embodiment, the network operations controller (NOC) 165, located at central control site 160, manages and supervises the operations of distributed site 110 and the other distributed sites in the network 100. For example, an owner may want to centrally manage a number of distributed fueling facilities. Certain operations, such as accounting and inventory control, may be efficiently done at this control center, although the specific allocation of management functions may vary according to individual requirements.

Also in communication with data communications network 150 is a central control accounting center (CCAC) 170 that acts as a hub or router, when necessary, to effect communications in accordance with the present invention, as explained more fully below. In this capacity, CCAC 170 handles communications between network 150 and virtual spares 171, 172, 173, and 174. These virtual spares are backup controllers that can be brought into use when one of the on-site primary controllers, such as on-site controller 140, is down for maintenance. CCAC 170 may also be connected directly (as shown by the broken line) to NOC 165, which in a preferred embodiment is located at the same site as the CCAC.

The on-site controllers in distributed network 100 need not be, and very often are not, identical or identically configured. Software product database 180 is used for storing information related to what software is resident on each on-site controller. Likewise, site configuration database 182 similarly maintains a record of the configuration parameters currently in use for each on-site controller in distributed network 100. (Although two configuration-information databases are shown in this embodiment, more or less could be present, and the nature and quantity of the configuration information stored there may of course vary from application to application.) Databases 180 and 182 are accessible though CCAC 170, though which they are populated and through which they are used to configure a virtual spare (as explained more fully below).

Note that even though system components of FIG. 1 are illustrated as separate physical entities, they can also be combined in one machine that is logically separated into a number of components. And as long as they can be placed in communication with the other system components as contemplated by the present invention, there is no requirement that they co-occupy the same machine, physical location, or site.

Figure 2:
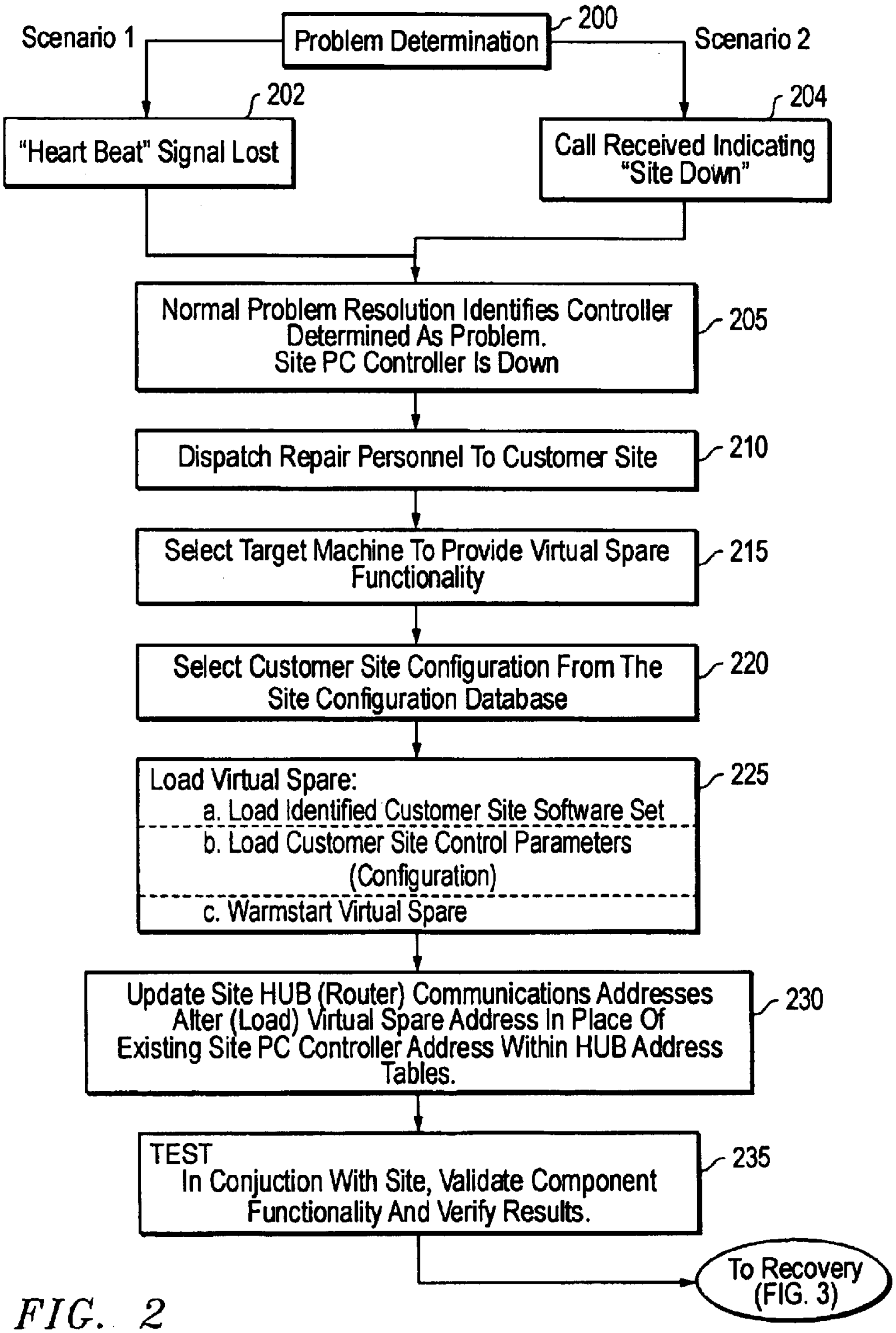
FIG. 2 is a flow chart illustrating the steps of the method of the present invention when bringing a spare controller on line.

FIG. 2 is a flow chart illustrating the steps of the method of the present invention when bringing-up a spare controller, for example virtual spare 171 shown in FIG. 1. (Note that no exact sequence is required, and the steps of the method of the present invention, including those of the illustrated embodiment, may be performed in any logically-allowed order.) The method begins with step 200, problem determination. This determination may occur in a variety of ways, two of which are shown in FIG. 2. In a first scenario, the problem determination includes the failure to receive a status message (sometimes called a 'heartbeat') that during normal operations is regularly transmitted by a properly functioning site controller (step 202). In a second scenario, a 'site-down' call is received (step 204) at the central control site 160, often from an attendant at the distributed site 110. Note that a system or method embodying the present invention need not include the capability to perform both scenarios, although in some circumstances both may be desirable.

The method then moves to step 205, where the system, and preferably NOC 165, makes a determination of which site controller is down and whether back-up or repair is required. Normally, at this point corrective action will be initiated to recover the failed site controller, which often involves dispatching repair personnel to the site (step 210). Also at this time, a target machine to provide virtual-spare functionality is selected (step 215), such as virtual spare 171 shown in FIG. 1. This selection is generally based on availability, but may be based on suitability for a particular situation or other factors as well. Reference is then made to the software product database 180 and the site configuration database 182 (step 220), to identify the software and parameters related to the down on-site controller identified in step 205. The virtual spare is then prepared (step 225). The distributed site software set is loaded from software product database 180 (step 225*a*), the site configuration parameters are loaded from site configuration database 182 (step 225*b*), and the virtual spare is then warm-started (step 225*c*).

Note that in a preferred embodiment, the NOC 165, upon being notified (or otherwise determining) that a virtual spare is required, selects the appropriate spare for use according to a predetermined set of criteria, and then initiates and supervises the virtual-spare configuration process. In another embodiment, some or all of these functions may be instead performed by hub 130, or by another component (for example one dedicated for this purpose).

In order to place the virtual spare 'on-line', the communication address tables in the on-site hub 130 must be updated so that the address of virtual spare 171 replaces that of on-site controller 140 (step 230). (The address of virtual spare 171 may include the address of CACC 170, which will receive messages sent to virtual spare 171 and route them appropriately.) At this point, all communications from the components at distributed site 110 that would ordinarily be directed to the on-site controller 140 are now routed to virtual spare 171. Virtual spare 171 now functions in place of the on-site controller 140, having been configured to do so in step 225. Note that although not shown as a step in FIG. 2, it may be necessary for hub 130 to perform a protocol conversion when routing data through network 150 instead of on-site controller 140. Typically, this means converting serial transmissions to TCP/IP format, but could involve other procedures as well. In a preferred embodiment, an interworking function is resident on hub 130 for this purpose. Finally, the configuration now in place is tested to ensure correct functionality (step 235), and any necessary adjustments made (step not shown). The virtual spare 171 continues to function for on-site controller 140 until the necessary maintenance is completed and recovery begins. Note that of the site controller outage (whether caused by a failure or the need for system maintenance) may be total or partial. Therefore the spare controller may not be required to assume all site-controller functions in order to manage operations of the on-site equipment during the outage (either because the failure was not total or because complete assumption is not necessary or desired). Note also that as used herein, the terms "back up" and "backing up" refer to replacing some or all controller functionality according to the system and method described, and not merely to the process of making a "backup" copy of software, or of database contents (although copies of software and data may certainly be useful while practicing the invention).

Figure 3:
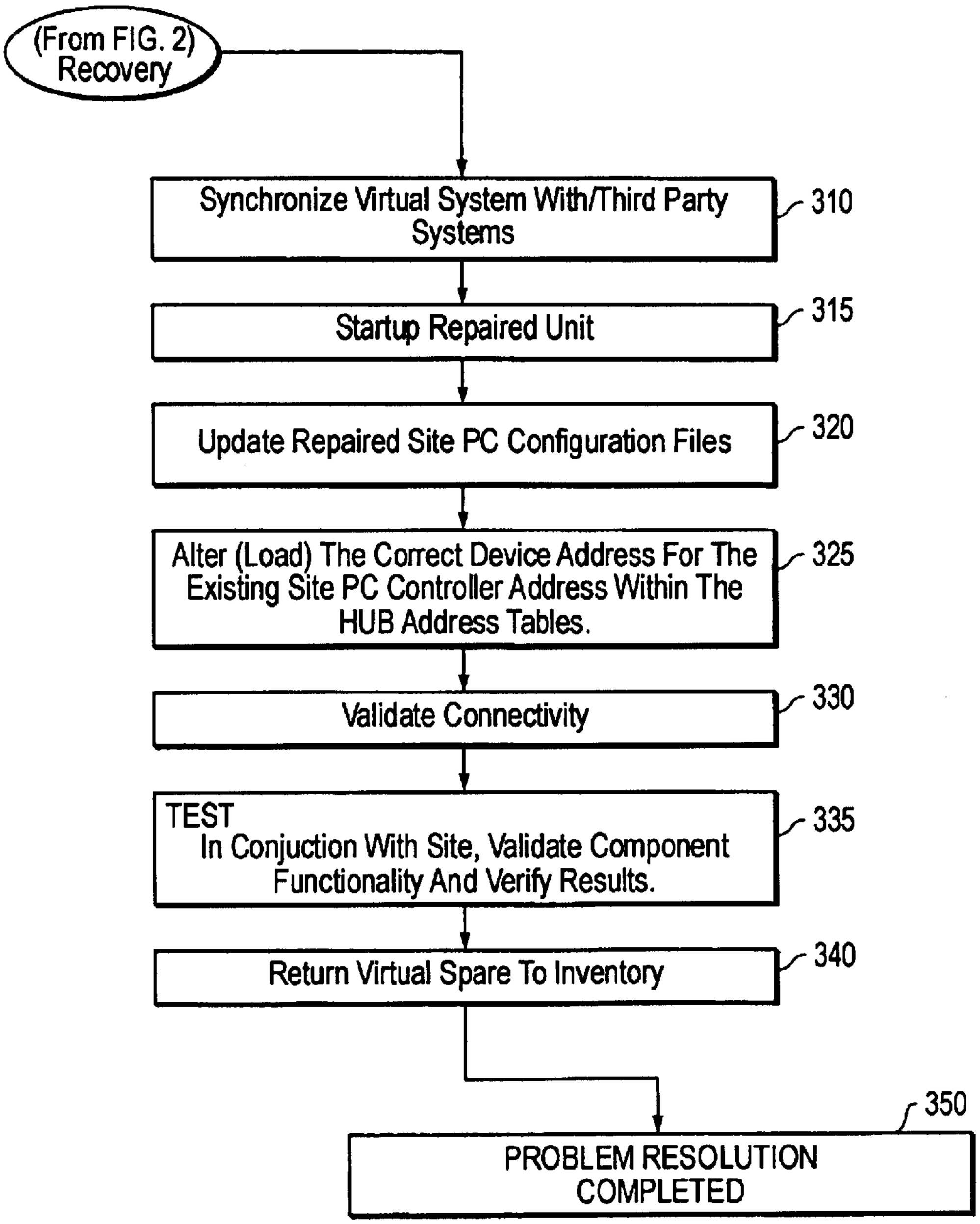
FIG. 3 is a flow chart illustrating the steps of a recovery process when a repaired site controller is brought back on line.

FIG. 3 is a flow chart illustrating the steps of a recovery process according to an embodiment of the present invention, where a repaired on-site controller is brought back on-line. The recovery process follows from process of FIG. 2 (or an equivalent method), where a virtual spare is bought in as a backup. First, the virtual system is synchronized with the third-party systems (step 310). For example, if virtual spare 171 has been functioning for on-site controller 140, virtual spare 171 performs the end-of-day (EOD) synchronization that would ordinarily have been done by the controller 140, such as balancing accounts, storing data, transmitting reports to the network operator or to third-party financial institutions. Any discrepancies found may then be addressed in the usual manner before the (now-repaired) controller 140 is brought back on-line. The repaired unit, such as on-site controller 140, is started-up (step 315). Since it has been down for a time, the repaired unit's configuration files are updated (step 320),as necessary. It is then ready to be placed back into operation, so the router address tables are altered to change the routing address for relevant communications from the virtual spare 171 address back to the on-site controller 140 address (step 325).

To ensure that the repaired site controller can perform its normal function, its connectivity to the network is validated (step 330), and the functionality of the on-site controller itself is also validated (step 335). Once the results of this test are verified, the virtual spare 171 is returned to inventory (step 340), that is, made available for other tasks. The process is finished at step 350, where the problem resolution has been achieved with a minimum of interruptions to normal system operations. Again, while in a preferred embodiment, the NOC 165 directs the process of restoring the site controller to service, this function may also be performed by hub 130, another system component, or shared.

Figure 4:
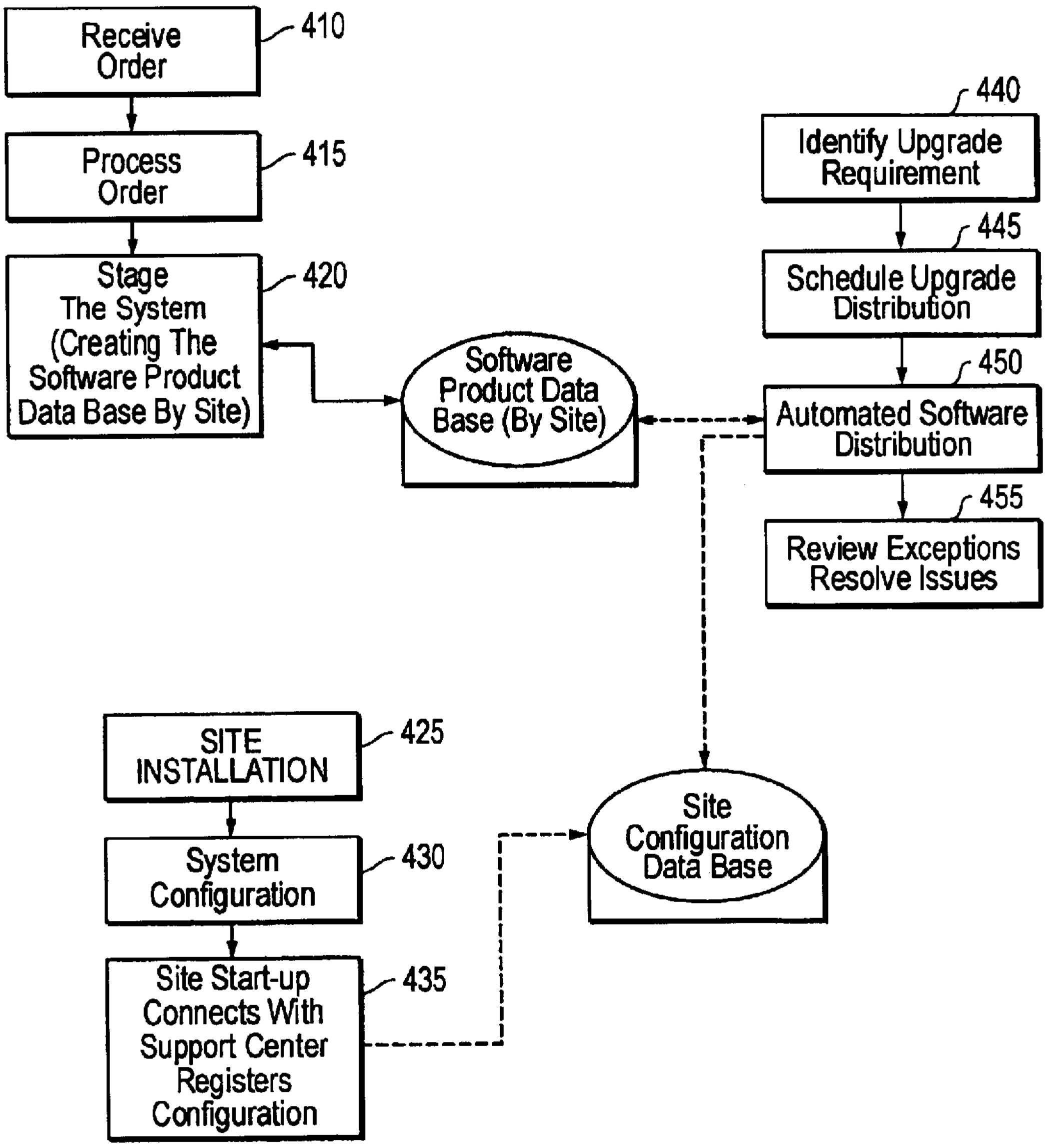
FIG. 4 is a flow chart illustrating the steps of database population in accordance with a method of the present invention.

FIG. 4 is a flow chart illustrating the steps of database population in accordance with a method of the present invention. The system and method of the present invention depend on prior creation of the appropriate database records, since by definition the rapid-and-efficient backup will be required when the site controller is unavailable and cannot provide the information needed to correctly configure a spare. An exception occurs in the case of a planned outage. Since it is in that case known when the site controller will be taken out of service, the virtual spare can be configured from a database created especially for the planned outage, or even directly from the still-operational site controller itself. Since premature failure of a site controller cannot be completely avoided, however, the preferred method remains the population of software product database 180 and the site configuration database 182 at the time the site is installed, or modified, as shown in FIG. 4.

The process of FIG. 4 begins with receiving an order for a new network of distributed sites (step 410). After the order is processed (step 415), the new site system is staged, and the software product database by site is created (step 420). At site installation, step 425, where the actual hardware is put into place and connected, for example as shown by the fueling facility 110 of FIG 1. The installed site system is configured (step 430), then the site controller is started-up and registers its configuration in the site configuration database (step 435).

System upgrades are populated in like fashion. When the need for an upgrade is identified (step 440), usually based on a customer request, the distribution of the upgrade software is scheduled (step 445). When ready, the system automatically distributes the software to the site controllers and updates the software product database to reflect the new site configuration (step 450). A system review process is then initiated to review exceptions and resolve issues (step 455). Any resulting changes affecting site configuration are added to the site configuration database (step not shown).

Based on the foregoing description, one of ordinary skill in the art should readily appreciate that the present invention advantageously provides a system and method for backing up distributed controllers in a data network.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A system for controlling, through a data network, an automated fuel-distribution site having fuel-dispensing equipment, said system comprising:

a site control system located at the site, comprising:

a site controller in communication with the fuel-dispensing equipment, the site controller being configured to manage operations of the fuel-dispensing equipment; and a site hub for routing communications between the site equipment and the site controller, and for routing communications to and from the data network;

a site-configuration database populated with information regarding the configuration of the site controller;

a central control system remotely located from the site comprising:

a spare controller reconfigurable to at least partially match the configuration of the site controller and manage the operations of the fuel-dispensing equipment;

a central controller that reconfigures the at least one spare controller when required with information from the site-configuration database; and a central hub for routing communications between the central controller, the spare controller, and the site-configuration database, and for routing communications to and from the data network; and means for determining when configuration of the spare controller is required for managing the operations of the fuel-dispensing equipment.

2. The system of claim 1, wherein the data network is the Internet, and further comprising a function available in the site hub for selectively translating site communications addressed to the site controller into an Internet protocol so that the communications can be routed through the Internet to the spare controller when it assumes management of the fuel-dispensing equipment.

3. The system of claim 1, wherein the means for determining when configuration of the spare controller is required comprises:

means at the site for generating a predetermined signal pattern when the site controller is functioning properly; and means for detecting when the predetermined signal pattern has been interrupted, indicating that the site controller is not functioning properly.

4. The system of claim 1, wherein the means for determining when configuration of the spare controller is required resides on the site hub, and wherein the site hub further comprises means for generating a notification message to alert the central controller that a site controller failure has been detected.

5. The system of claim 1, further comprising a function in the central controller for directing the site hub to begin routing to the spare controller communications addressed to the site controller.

6. The system of claim 1, wherein the site-configuration database is maintained at the fuel-distribution site.

7. The system of claim 1, wherein the central control system includes:

a plurality of spare controllers in communication with the data network and remotely located from the site; and a function in the central controller for selecting one of the plurality of spare controllers to be configured to manage the operations of the site equipment.

8. A system for backing up a site controller in a distributed network having a plurality of sites, each site having a site controller that is configured to manage operating equipment located at the site and a site hub for routing communications between the site equipment and the site controller, each site hub also being in communication with a data communications network, said system comprising:

a configuration database populated with configuration information indicating how each of the plurality of site controllers is configured;

a configurable spare controller remotely located from the sites and in communication with the data communications network, said spare controller being configurable using the configuration information in the database to manage the operating equipment at a selected site by communicating with the hub at the selected site over the data communications network;

a central controller remotely located from the sites and in communication with the data communications network, the central controller including means for configuring the spare controller with configuration information for the site controller at the selected site when backing up of the site controller at the selected site is required; and means for determining when backing up of the site controller at the selected site is required.

9. The system of claim 8, wherein the means for determining when backing up of the site controller at the selected site is required resides on the hub at the selected site, and wherein the hub at the selected site further comprises means for generating a notification message to alert the central controller that a site controller failure at the selected site has been detected.

10. The system of claim 8, wherein the central controller also includes a function that directs the hub to begin routing to the spare controller communications addressed to the site controller.

11. The system of claim 8, further comprising:

a plurality of spare controllers remotely located from the sites and in communication with the data network; and a function in the central controller for selecting one of the plurality of spare controllers to assume the function of the site controller at the selected site.

12. A router for connecting a plurality of site components to a site controller and for connecting the site controller through a data network to a central controller and at least one backup site controller, the router comprising:

means for determining when the site controller is not operational; and means for rerouting to the backup site controller, communications directed to site controller when the site controller is not operational.

13. The router of claim 12, further comprising a function in the router for converting between serial-interface data and Internet protocol (IP) data packets.

14. A method of backing-up an automated fueling-station controller that manages station components at a fueling station by communicating with them through a station router, the fueling station being part of a distributed network having a central controller that communicates with the station router through a data network, said method comprising the steps of:

providing at least one spare controller remotely located from the site and in communication with the data network;

populating a database with configuration information for the station controller;

detecting a station controller failure;

configuring the spare controller using the configuration information from the database so that the spare controller is capable of at least partially functioning as the station controller; and rerouting, by the station router, station communications to and from the spare controller over the data communications network so that the spare controller can manage the station components.

15. The method of claim 14, wherein the step of detecting a station controller failure includes detecting the failure of a station-controller heartbeat signal.

16. The method of claim 14, wherein the step of providing at least one spare controller includes providing a plurality of spare controllers remotely located from the site, and the method further comprises the step of selecting one of the plurality of controllers to act as a backup upon detecting a station controller failure.

17. The method of claim 14, further comprising the step of translating the station communications before rerouting them.

18. A method of backing-up a site controller that manages a site in a distributed network by communicating through a hub, the distributed network including a central controller, a database, and at least one spare controller remotely located from the site and in communication with the hub through a data network, the method comprising the steps of:

populating the database with configuration parameters for the site controller;

detecting a site controller failure;

configuring the spare controller with the configuration parameters for the site controller; and managing the site using the spare controller as a replacement for the failed site controller by routing site-management communications through the data network.

19. The method of claim 18, wherein the distributed network includes a plurality of spare controllers, and the method further comprises the step of selecting a spare controller from the plurality of spare controllers.

20. The method of claim 18, further comprising the steps of:

determining that the site controller is ready to return to service; and transferring site management back to the site controller.

* * * * *